United States Patent
Attimont et al.

(10) Patent No.: US 7,110,418 B2
(45) Date of Patent: Sep. 19, 2006

(54) METHOD TO ENSURE THE QUALITY OF PREFERRED COMMUNICATION SERVICES, A LOCAL NETWORK, A STATION, A LOCAL NETWORK CONTROLLER AND A PROGRAM MODULE THEREFOR

(75) Inventors: Luc Attimont, Saint Germain en Laye (FR); Jannick Bodin, Garches (FR)

(73) Assignee: Alcatel, Paris (FR)

( * ) Notice: Subject to any disclaimer, the term of this patent is extended or adjusted under 35 U.S.C. 154(b) by 954 days.

(21) Appl. No.: 10/101,322

(22) Filed: Mar. 20, 2002

(65) Prior Publication Data

US 2002/0146032 A1    Oct. 10, 2002

(30) Foreign Application Priority Data

Apr. 10, 2001   (EP)   ................... 01440101

(51) Int. Cl.
*H04L 12/413*   (2006.01)
(52) U.S. Cl. ...................... 370/445; 370/448
(58) Field of Classification Search ............... 370/445, 370/447, 448, 338
See application file for complete search history.

(56) References Cited

U.S. PATENT DOCUMENTS

| | | | | |
|---|---|---|---|---|
| 5,353,287 | A * | 10/1994 | Kuddes et al. | 370/448 |
| 6,172,984 | B1 * | 1/2001 | Beyda et al. | 370/448 |
| 6,501,764 | B1 * | 12/2002 | Fudatate et al. | 370/445 |
| 6,819,676 | B1 * | 11/2004 | Min | 370/448 |
| 6,917,606 | B1 * | 7/2005 | Sashihara | 370/338 |

FOREIGN PATENT DOCUMENTS

EP    1 017 198 A2    7/2000

OTHER PUBLICATIONS

Ulusoy O: "Network Access Protocol for Hard Real-Time Communication Systems" Computer Communications, Elsevier Science Publishers BV, Amsterdam, NL. vol. 18, No. 12, Dec. 1, 1995, pp. 943-948, XP004032425.
Jia F et al.: "The Superchannel Scheme for 1-10 Integrated Services on Multiple Access Broadcast Networks" Computer Networks and ISDN Systems, North Holland Publishing. Amsterdam, NL. vol. 27, No. 11, Oct. 1, 1995, pp. 1523-1543, XP004002502.

* cited by examiner

*Primary Examiner*—Hassan Kizou
*Assistant Examiner*—Albert T. Chou
(74) *Attorney, Agent, or Firm*—Sughrue Mion, PLLC

(57) ABSTRACT

The invention relates to a method to ensure the quality of preferred (communications) services, especially voice services, in a local data network with different types of services, where data congestion or data collision on a shared transmission medium is treated by a collision detection method and by application of re-transmission rules after detection of data collisions, wherein depending on the type of service, the corresponding data packets are subject to different re-transmission rules and wherein the different re-transmission rules each define a set of different parameters for an algorithm to randomly calculate the backoff time, that a station has to wait after a collision detection, before it re-transmits a data packet affected by the collision, the different sets of parameters comprising each at least the mean of said backoff time, as well as to a local network, a station, a local network controller and a program module therefor.

15 Claims, 2 Drawing Sheets

METHOD TO ENSURE THE QUALITY OF PREFERRED COMMUNICATION SERVICES, A LOCAL NETWORK, A STATION, A LOCAL NETWORK CONTROLLER AND A PROGRAM MODULE THEREFOR

BACKGROUND OF THE INVENTION

The invention is based on a priority application EP 01440101.2, which is hereby incorporated by reference.

The invention relates to a method to ensure the quality of preferred (communications) services, especially voice services, in a local data network with different types of services, wherein data congestion or data collision on a shared transmission medium is treated by a collision detection method and wherein different re-transmission rules are applied corresponding to the type of service, as well as to a local network, a station, a local network controller an a program module therefor.

In Internet Telephony voice is transported over a network using data packets instead of circuit switched connections over voice only networks. Internet Telephony or IP Telephony refers to the transfer of voice over the Internet Protocol (VOIP) of the so-called TCP/IP (Transfer Control Protocol/Internet protocol) protocol suite.

In an advanced corporate enterprise, IP telephone terminals connect via a Local Area Network (LAN), often based on the so-called Ethernet, along with Personal Computers. These IP telephones interact with a VOIP-enabled private exchange (PBX) for call set-up and administration and access to the external (public switched) telephone network (PSTN) and/or an external packet network, especially the internet.

The transmission medium or bus of an Ethernet system is a shared medium, where transmission is not controlled by a central control unit, e.g. a bus master, but all terminals or stations connected follow certain rules, when transmitting data on the transmission medium. These rules are described in the document "IEEE Std 802.3, Carrier sense multiple access with collision detection (CSMA/CD) access method and physical layer specifications". All stations are always listening the transmission medium for data traffic and they wait for sending data until said data traffic has ceased. If, at one time, two ore more stations start sending data on the transmission medium, data collision occurs. Said stations, detecting the collision, stop sending and wait each for a specific random time until starting re-transmission. The detection of a collision may be carried out by supervision of the voltage of received signals. See following example: If the data signal sent on the bus shows two voltage levels, e.g. 0 Volt for a bit representing the value "0" and 5 Volt for a bit representing the value "1", a collision is detected in a receiving station as soon as said station sees a signal voltage, that exceeds the defined maximum voltage of the data signals, i.e. 5 Volt, caused by superposition of two or more data signals.

For a reliable and fast detection of collisions, any station detecting a collision may explicitly send out a specific information, a so-called jam signal. As soon as this jam signal is received by the sending stations, said stations stop sending. Without limiting the invention, it is assumed in the following, that an explicit jam signal is sent by the stations, when a collision is detected.

The more stations are connected to the transmission medium and the more these stations are actively sending data, the probability for data collision increases; it might happen, that one station has to start re-transmission several times until data transmission can be successfully completed. For avoiding dead locks evoked by peak situations of bursty data traffic, the number of re-transmission trials can be limited. When exceeding this limit, the affected data packets are dropped.

In the following, only the Ethernet is considered for the two lowest layers of a local network, the data link level and the physical level of the so-called OSI reference model. Nevertheless, the invention can be carried out in any network with a shared (transmission) medium, where transmission on this medium is controlled by the stations themselves.

In classical local area networks based on Ethernet, generally all data is treated uniquely. The previously described mechanism of collision does not distinguish between different types of data. But more and more, additionally to "normal data", e.g. data to be visualised on a display, real time data traffic, especially voice (data) traffic for voice over IP applications, is to be treated by local area networks.

Real time communication applications exhibit strict latency requirements. A lot of real time communication application require, that time delay between sending and receiving data, must not exceed a defined time value. Voice over IP applications, e.g., require a maximum delay of about 0, 2 seconds. Data exceeding a defined delay time is dropped, i.e. is not used for communication. To guarantee high quality real time communication services, the drop rate, i.e. the ratio between the number of dropped data packets and the number of transmitted data packets, has to be kept low.

For economic reasons, it is required, to both handle normal data traffic and real time data traffic in a unique local network. But today no method of different treatment of both types of data in local networks with a shared medium exists.

U.S. Pat. No. 6,172,984 discloses a system and method for reducing the latency for time sensitive data over the shared medium of a local network. A station ready to send time sensitive data sends a collision signal on the bus and immediately proceeds with the high priority transmission. This method, however, does not solve the problem of collisions between high priority data itself.

SUMMARY OF THE INVENTION

The object of the invention is to ensure the quality of real time or preferred communication services in a local network solving collision problems between each types of data.

The basic principle of the invention is that the quality of preferred communication services in a local network with different services is ensured by distinguishing between different types of services. After detection of data congestion or data collision, depending on the type of service, the corresponding data packets are subject to different re-transmission rules to ensure a preferred treatment of data belonging to a preferred type of service. the different re-transmission rules each define different sets of parameters of each an algorithm to randomly calculate the backoff time, that a station has to wait after a collision detection, before it re-transmits a data packet affected by the collision the different sets of parameters comprising each at least the mean of said backoff time.

BRIEF DESCRIPTION OF THE FIGURES

Further developments of the invention can be gathered from the dependent claims and the following description.

In the following the invention will be explained further making reference to the attached drawings in which:

FIG. 1 schematically shows a local (area) network LN and a further network IPN. This network might be any data packet network, e.g. the internet, an internet access network or an intranet. In the following, the further network IPN will be considered to be the internet IPN. The local network LN shows a first station T1, a second station T2, a gateway GW and a transmission medium or bus TM. The stations T1 and T2 and the Gateway GW are connected to the bus TM. The Gateway GW connects the local network LN to the Internet IPN. For both stations T1 and T2, the first station T1 exemplary shows a central processor CPU and a local network controller LC connected to each the central processor CPU and the bus TM. The local network controller LC exemplary shows, in a layered structure, a (data) decapsulation and encapsulation unit DED, an access controller MAC and a physical layer unit PHL. A memory unit MEM is shown in the decapsulation and encapsulation unit DED.

Figure 1:
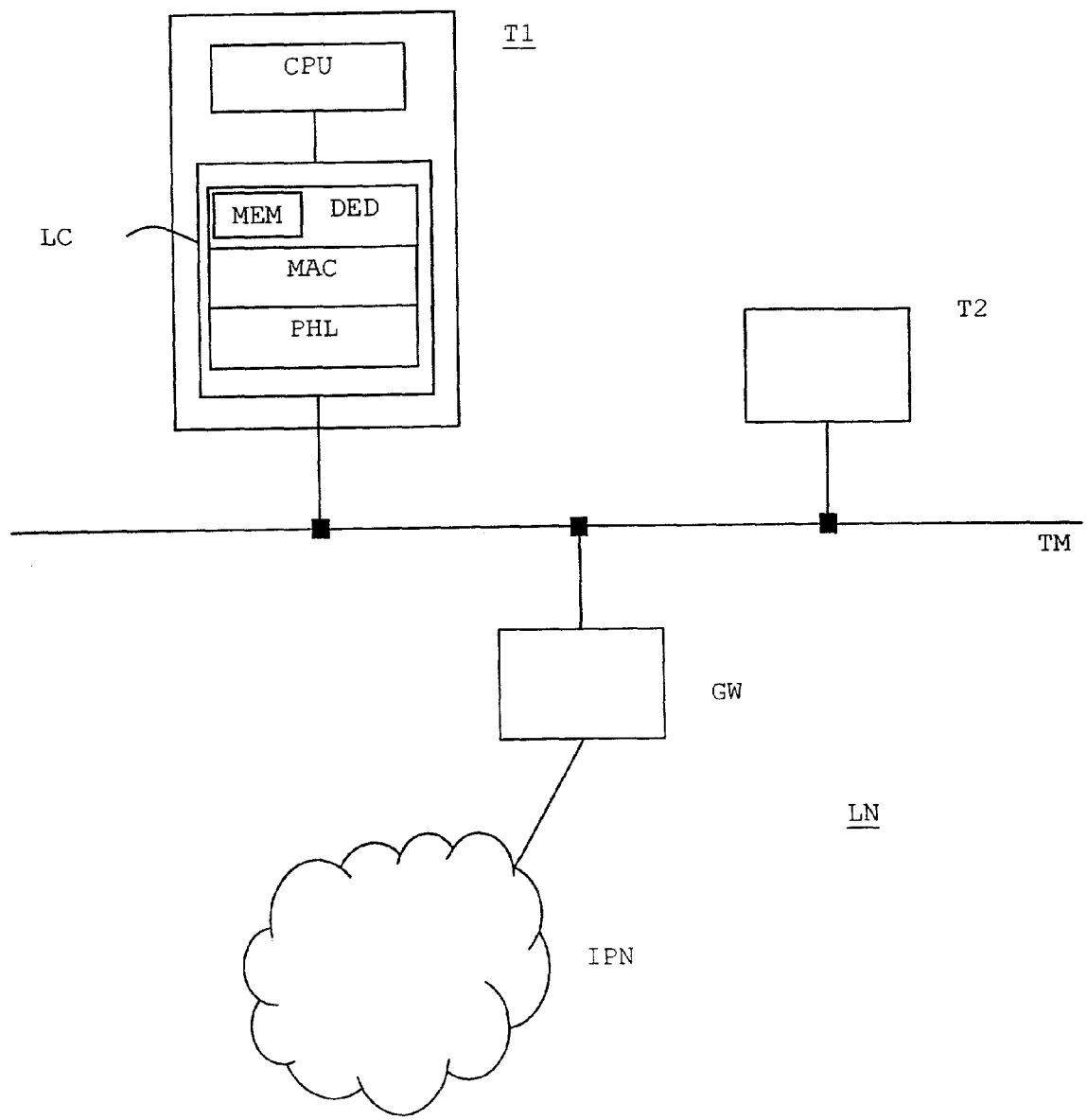
FIG. 1 shows a local network according to the invention connected to a further network.

The functions of the local network controller LC is explained by the following transmission scenario:

Sending digital information from the first station T1 to the second station T2, the central processing unit CPU generates a so-called (IP-)datagram out of said digital information forming a data packet and adding a (packet) header comprising control information, e.g. a transmission control protocol (TCP) header. If necessary, said information is divided into several data packets generating one datagram out of each packet. The datagram(s) is/are transferred to the memory unit MEM of the decapsulation and encapsulation unit DED. The decapsulation and encapsulation unit DED, encapsulates each datagram, i.e. for each datagram it generates a frame with a destination address field, a source address field, a length information field, a data field and a frame check field and, if necessary, further additional fields. The source address field indicates the physical address of the sending station T1, the destination address field indicates the physical address of the receiving station T2, the length field indicates the frame length, the data field contains said datagram and the frame check field contains a cyclic redundancy code to check the correctness of the received frame in the receiving station T2. The length field alternatively may be used as a type field containing a code or value bigger than the maximum possible frame length, that indicates a protocol carried by the Ethernet, e.g. a value 0800H (hexadecimal) may indicate the internet protocol. Said frame is handled over to the access controller MAC, that transforms the frame data into a serial bit stream. This serial bit stream is handed over to the physical layer unit PHL, that transforms the bit stream into an electromagnetic or physical data signal to be transmitted over the bus TM.

On the receiving station T2, now in reverse direction, the (physical) data signal is re-transformed into a serial bit stream and the serial bit stream is re-transformed into frames. For each frame, the frame check field is checked for correctness of the received frame and the destination address field is checked, whether the frame is intended for the receiving station T2. If the received frame is recognised to be correct and to be intended for said station, each datagram included in one frame is separated from the remaining frame and handed over to the central processing unit CPU.

If information is to be sent outside the local network LN, e.g. from the first station T1 to the internet, the data is sent to the gateway GW. This gateway GW terminates the local network protocol extracting the IP datagrams out of the corresponding frames and sending the IP datagrams to the internet INT, using the required protocol of the internet INT.

The bus TM is a shared medium used by all sending stations to transmit data to receiving stations. As described in the beginning, there is no central bus function managing the access to the bus TM. Collisions of data signals simultaneously sent to the bus TM by different stations must be managed by the stations themselves. It is one function of the physical layer unit PHL of each station (T1, T2) to always listen to the bus and to inform the access controller MAC, whether data signals are detected or not. When the bus is considered to be free, the access controller MAC of the sending station T1 starts to send a bit stream, that is converted into a data signal and sent to the bus TM by the physical layer unit PHL. As soon as a data signal of another station is detected, the physical layer unit PHL informs the access controller MAC, that immediately stops sending this data, and instead of said data, sends a jam signal. Subsequently, the access controller MAC wait for a certain time, the so-called backoff time, until retransmission of the affected frame is started. For each collision incident a different backoff time is determined randomly, thus stations having sent conflicting data signals, normally do not wait for the same backoff time to retransmit their data.

With an increasing number of active stations and increasing bus load, the probability for collisions increases. Additionally, the probability increases, that a station has to initiate retransmission of one datagram several times in sequence. Normally, the backoff time of subsequent collision incidences is increased each time to react against increasing collision incidents. This method is well adapted for normal data to be transmitted. In those applications, a low packet loss ratio is much more important than a low delay time. If congestion on the bus occurs, an increasing delay time is acceptable. For real time data however, an increasing delay time causes problems. As described in the beginning, real time data, especially voice data, is very sensitive to delay. A local network (LN) with mixed normal data and real time data must provide a special mechanism to guarantee the quality of real time services.

Figure 2:
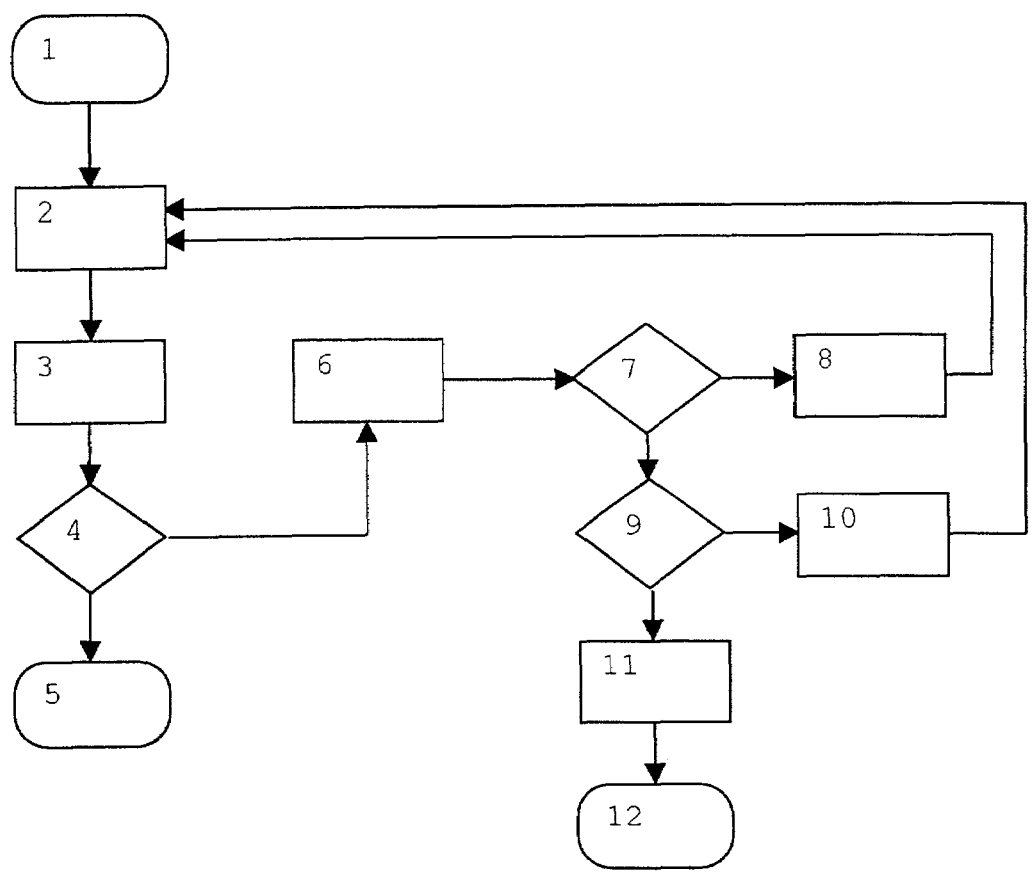
FIG. 2 shows an exemplary flow chart diagram to be executed in a station according to the invention and FIG. 3 shows an example for data encapsulation in the internet protocol layer and the Ethernet layer.

In FIG. 2 a flow chart diagram of an exemplary functional sequence for sending a data packet to be executed in a local network controller LC according to the invention by way of example is shown.

In Step 1, a data packet is prepared for sending on the bus TM.

In the following step 2, it is waited until the bus is quiet, i.e. no signals are detected.

In the following step 3, the prepared data is sent to the bus TM.

In the following step 4, a decision is taken. If a collision is detected, data transmission is stopped and step 6 executed next. If no collision is detected, transmission of the data packet is completed before a transfer is made to step 5.

In step 5, the transmission is successfully completed. A new data packet restarting with step 1 may be transmitted.

In step 6, a jam signal is send out to inform all other sending stations.

In the following step 7, a further decision is taken. If the data packet is recognized as normal data packet a transfer is made to step 8. If the data packet is recognized as real time data packet, a transfer is made to step 9.

In step 8, a first backoff time is awaited and then a transfer is made back to step 2.

In step 9, a further decision is taken. If a defined maximum time or a defined number of subsequent retransmission attempts is exceeded, a transfer is made to step 11. Otherwise a transfer is made to step 10.

In step 10, a second backoff time is awaited and then a transfer is made back to step 2.

In step 11, the data packet is dropped.

In step 12, (unsuccessful) transmission of the data packed is completed. A new data packet restarting with step 1 may be transmitted.

The fist backoff time of step 8 is recalculated each time. Known in the prior art, this time is calculated by a pseudo random algorithm. The mean backoff time starts to be relatively short for a first retransmission attempt of a data packet. Each subsequent retransmission attempt, the mean backoff time is increased. The increase of the mean time often follows an exponential curve. Not shown in the flow chart diagram, the data packet might be dropped after a certain number of (unsuccessful) retransmission attempts. This method is widely used in Ethernet local networks.

The second backoff time of step 10 is also calculated randomly each time, but with shorter mean than the first backoff time. This is to prefer real time data packets. In order to achieve a more deterministic behavior (i.e. to be able to initiate at least one or several retransmission attempts within the maximum allowed time delay), the variance is much smaller than the variance of the random process for the first backoff time. Moreover there is no increase of the mean time or at least the increase is smaller than the increase of the first backoff time. Alternatively or additionally, the maximum value for the second backoff time is limited. With this method it is ensured or at least very likely, that after a collision of normal data with real time data, the station sending the real time data will initiate retransmission earlier than other stations sending normal data. If congestion on the bus is that high, that even real time data is blocked, e.g. if a lot of stations simultaneously try to send real time data, the respective data packets are dropped much earlier than other data packets. The real time packet is either dropped if said data packed could not be successfully transmitted in a defined maximum time (i.e. the maximum allowed delay time) or after a limited number of retransmission attempts. Said limited number might be calculated on the base of the mean backoff time or the minimum second backoff time. Whereas normal data is transmitted in a so-called best effort mode, minimizing the loss ratio, real time data is now transmitted in an expedited delivery mode, but the corresponding real time packets are early dropped.

In a first embodiment to distinguish normal data packets and real time data packets, the central processing unit CPU informs the local network controller LC about the type of service, when transferring a datagram.

Local network controllers (LN) or Ethernet controllers often have an intelligent Direct Memory Access Circuit (DMA). A direct memory access technique allows a bigger amount of datagrams to be transferred directly between the bus and the local network controller (LN), without any participation of the central processing unit CPU. An array or a chained circular buffer of command blocks to be handled subsequently provides a dialog between the central processing unit CPU and the local network controller LC. In each command block it is indicated in special fields, e.g. whether the command block is valid, whether the command block is ready for handling and whether the corresponding frame was successfully emitted. To inform the local network controller LC about the type of service, a field is added in the command block to specify for the corresponding frame the type of service. Additionally or alternatively, the maximum number of retransmission attempts or the maximum transmission attempt time for this data is added.

Figure 3:
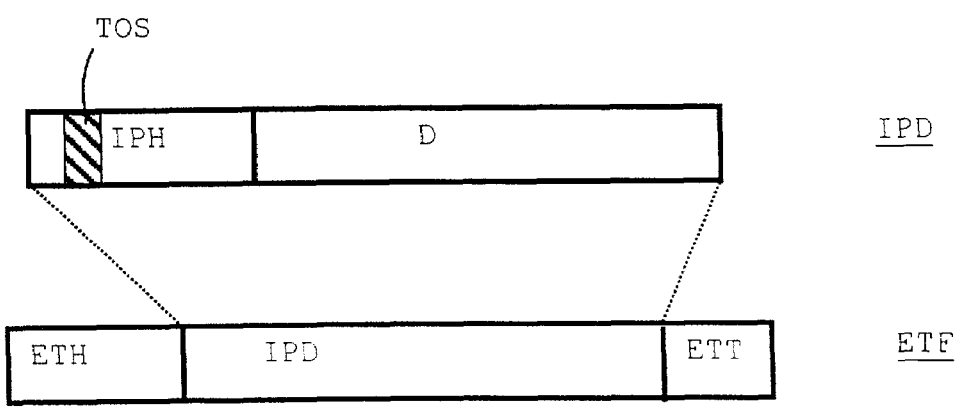

In an alternative embodiment, no additional information from the central processing unit CPU is necessary. For explanation of this embodiment, FIG. 3 shows an example for data encapsulation in the internet protocol layer and the Ethernet layer. An Ethernet Frame ETF consists of an Ethernet header ETH, an (IP-) datagram and an Ethernet Trailer ETT. The Ethernet header ETH contains different fields, like a preamble, address fields, a frame length field. The Ethernet trailer ETT consist of a control field described under FIG. 1. The Ethernet frame ETF corresponds to the data link layer, the second level of the OSI reference model. The Datagram IPD refers to the network layer, the second level of the OSI reference model. The Datagram IPD consists of a part of data D and an IP-header IPH. The IP header consists of several data fields. One of these data fields is the so-called type-of-service field TOS. The other fields are not discussed here.

Applying the so-called DiffServ Protocol defined in the document "RFC 2474" of the Internet Engineering Task Force (IETF), the type-of-service field TOS indicates whether the corresponding datagram IPD is to be forwarded either in the mode "expedited delivery, dropable" or in the mode "best effort, low drop rate". The local network controller LC now autonomously chooses the requested mode, by analyzing the type-of-service field TOS of the datagram.

In a further embodiment, more than two different types of data are processed. The different types are either indicated by communication between the central processing unit CPU and the local network controller LC or by the type-of-service field TOS of the datagrams. In a system with e.g. three different priority levels, the highest priority might be assigned to voice data, that is most sensitive to delays. The second highest priority might be assigned to other real time data and the lowest priority might be assigned to normal data. Data with the highest priority is forwarded very expedite and is dropped very early. Data with the second highest priority is forwarded expedite and is early dropped. The normal data is forwarded with best effort and dropped late.

In a further embodiment, the local network controller LC re-orders frames to be sent, if two or more frames are stored in the emission queue and if frames belong to different types of service. The frames are re-ordered according to their priority, i.e. frames with the highest priority or the lowest maximum allowed delay time are preferred and sent first.

The invention claimed is:

1. A method of ensuring quality of preferred services, in a data network in which stations transmit data as packets of different types of services on a shared transmission medium and data collision on the shared transmission medium is managed by a collision detection protocol in which different re-transmission rules after detection of data collisions are applied corresponding to the type of service, the method comprising:

determining a type of service of a packet to be transmitted on the shared transmission medium by a station of the data network, said type of service including at least a preferred type of service and a non-preferred type of service;

detecting a collision of the packet, which is transmitted by the station on the shared transmission medium, with at least one other packet; and calculating a random backoff time according to an algorithm that utilizes the different re-transmission rules depending on the type of service of the packet that is determined, wherein the different re-transmission rules each define a set of different parameters of the algorithm to randomly calculate the backoff time, which the station waits after the collision is detected until retransmitting the data packet that is affected by the collision, the sets of different parameters comprising each at least a preferred service mean value of the backoff time and a non-preferred service mean value of the backoff time, which is less than said preferred service mean value, wherein said random backoff time is calculated with said preferred service mean value if the packet is determined to be the preferred type of service and the random backoff time is calculated with said non-preferred service mean value if the packet is determined to be the non-preferred service.

2. A method according to claim 1, wherein the different parameters further comprise a different variance of said backoff timex, wherein the different variance includes a preferred service variance value and a non-preferred service variance value, wherein said random backoff time is calculated with said preferred service mean value and said preferred service variance value if the packet is determined to be the preferred type of service and the random backoff time is calculated with said non-preferred service mean value and the non-preferred service variance value if the packet is determined to be the non-preferred service.

3. A method according to claim 1, wherein the different re-transmission rules each define a different number of re-transmission attempts, before the data packet, that is several times consecutively affected by collisions, is to be dropped.

4. A method according to claim 1, wherein the re-transmission rule for data packets of the preferred type of service defines a maximum time interval and that if a data packet can not be successfully transmitted in said time interval, said data packet is dropped.

5. A method according to claim 1, wherein the preferred type of service is a voice service in which voice data is transmitted in packets on the data network and the non-preferred type of service is a service in which data of a type other than voice data is transmitted in packets on the data network.

6. A method according to claim 1, wherein said determining the type of service of the packet is based on additional data from the station that is received and evaluated.

7. A method according to claim 1, wherein said determining the type of service of the packet includes analyzing a defined information field of the packet which indicates service type and said determination of the type of service is based upon a result of the analyzing of the defined information field.

8. A network with stations connected to a shared transmission medium transmit data as packets of different types of services on the shared transmission medium and data collision on the shared transmission medium is managed by a collision detection protocol in which different re-transmission rules after detection of data collisions are applied corresponding to the type of service, the network comprising:

means for determining a type of service of a packet to be transmitted on the shared transmission medium by a station of the data network, said type of service including at least a preferred type of service and a non-preferred type of service;

means for detecting a collision of the packet, which is transmitted by the station on the shared transmission medium, with at least one other packet; and means for calculating a random backoff time according to an algorithm that utilizes the different re-transmission rules depending on the type of service of the packet that is determined, wherein the different re-transmission rules each define a set of different parameters of the algorithm to randomly calculate the backoff time, which the station waits after the collision is detected until retransmitting the data packet that is affected by the collision, the sets of different parameters comprising each at least a preferred service mean value of the backoff time and a non-preferred service mean value of the backoff time, which is less than said preferred service mean value, wherein said random backoff time is calculated with said preferred service mean value if the packet is determined to be the preferred type of service and the random backoff time is calculated with said non-preferred service mean value if the packet is determined to be the non-preferred service.

9. A network according to claim 8, wherein the different variance includes a preferred service variance value and a non-preferred service variance value, wherein said random backoff time is calculated with said preferred service mean value and said preferred service variance value if the packet is determined to be the preferred type of service and the random backoff time is calculated with said non-preferred service mean value and the non-preferred service variance value if the packet is determined to be the non-preferred service.

10. A network according to claim 8, wherein the different re-transmission rules each define a different number of re-transmission attempts, before the data packet, that is several times consecutively affected by collisions, is to be dropped.

11. A network according to claim 8, wherein the re-transmission rule for data packets of the preferred type of service defines a maximum time interval and that if a data packet can not be successfully transmitted in said time interval, said data packet is dropped.

12. A network according to claim 8, wherein the preferred type of service is a voice service in which voice data is transmitted in packets on the data network and the non-preferred type of service is a service in which data of a type other than voice data is transmitted in packets on the data network.

13. A network according to claim 8, wherein said means for determining the type of service of the packet determines the type of service based on additional data from the station that is received and evaluated.

14. A network according to claim 8, wherein said means for determining the type of service of the packet analyzes a defined information field of the packet which indicates service type and determines the type of service is based upon a result of analyzing the defined information field.

15. A computer program embodied in a tangible medium for executing a method of ensuring quality of preferred services in a data network in which stations transmit data as packets of different types of services on a shared transmission medium and data collision on the shared transmission medium is managed by a collision detection protocol in which different re-transmission rules after detection of data collisions are applied corresponding to the type of service, the method comprising:

- determining a type of service of a packet to be transmitted on the shared transmission medium by a station of the data network, said type of service including at least a preferred type of service and a non-preferred type of service;
- detecting a collision of the packet, which is transmitted by the station on the shared transmission medium, with at least one other packet; and
- calculating a random backoff time according to an algorithm that utilizes the different re-transmission rules depending on the type of service of the packet that is determined,
- wherein the different re-transmission rules each define a set of different parameters of the algorithm to randomly calculate the backoff time, which the station waits after the collision is detected until retransmitting the data packet that is affected by the collision, the sets of different parameters comprising each at least a preferred service mean value of the backoff time and a non-preferred service mean value of the backoff time, which is less than said preferred service mean value,
- wherein said random backoff time is calculated with said preferred service mean value if the packet is determined to be the preferred type of service and the random backoff time is calculated with said non-preferred service mean value if the packet is determined to be the non-preferred service.

* * * * *